United States Patent [19]
Walles

[11] Patent Number: 5,694,507
[45] Date of Patent: Dec. 2, 1997

[54] HOLDER FOR INSERTING AN OPTICAL FIBER IN A DATA COMMUNICATION SYSTEM

[75] Inventor: Gerard G. Walles, Sandy Hook, Conn.

[73] Assignee: Sikorsky Aircraft Corporation, Stratford, Conn.

[21] Appl. No.: 551,496

[22] Filed: Nov. 1, 1995

[51] Int. Cl.$^6$ .................................................. G02B 6/38
[52] U.S. Cl. ........................................... 385/72; 385/60
[58] Field of Search .............................. 385/70–74, 60, 385/61, 76, 78, 84, 87, 86, 88

[56] References Cited

U.S. PATENT DOCUMENTS

| | | | |
|---|---|---|---|
| 4,190,316 | 2/1980 | Malsby et al. | 385/61 |
| 4,279,467 | 7/1981 | Borsuk et al. | 385/72 |
| 4,291,941 | 9/1981 | Melzer | 385/61 |
| 4,319,802 | 3/1982 | Bowes | 385/87 |
| 4,597,632 | 7/1986 | Mallinson | 385/72 |
| 4,712,860 | 12/1987 | Corrales | 385/78 |
| 4,929,046 | 5/1990 | Barlow | 385/72 |
| 4,938,558 | 7/1990 | Miller et al. | 385/78 |
| 5,048,916 | 9/1991 | Caron | 385/71 |
| 5,129,023 | 7/1992 | Anderson et al. | 385/70 |
| 5,222,169 | 6/1993 | Chang et al. | 385/87 |
| 5,371,819 | 12/1994 | Szegda | 385/75 |
| 5,444,810 | 8/1995 | Szegda | 385/139 |
| 5,448,676 | 9/1995 | White et al. | 385/88 |
| 5,515,466 | 5/1996 | Lee | 385/78 |

*Primary Examiner*—John D. Lee
*Assistant Examiner*—Ellen E. Kang
*Attorney, Agent, or Firm*—Seidel, Gonda, Lavorgna & Monaco, PC

[57] ABSTRACT

A holder operative for inserting a fiber in a data communication system and method for using the same. The holder is adapted to connect a terminus of a first fiber to a terminus of a second fiber. The terminus of each fiber including an optical fiber surrounded by a ferrule. The ferrule is mounted within a plug member which has a shoulder portion. The holder includes a housing which has first and second openings formed therein. At least one chamber is formed in the housing and communicates with the first and second openings. The chamber is adapted to receive the termini of the first and second fibers. The holder also includes means for maintaining the termini in spaced apart relationship. In one embodiment, the termini are maintained in spaced apart relationship by means of two steps at spaced location within the chamber. The shoulder portion of each terminus seats against the step when the terminus is placed within the chamber. The holder also includes means for removably attaching the fibers to the housing to retain the termini within the chamber.

28 Claims, 5 Drawing Sheets

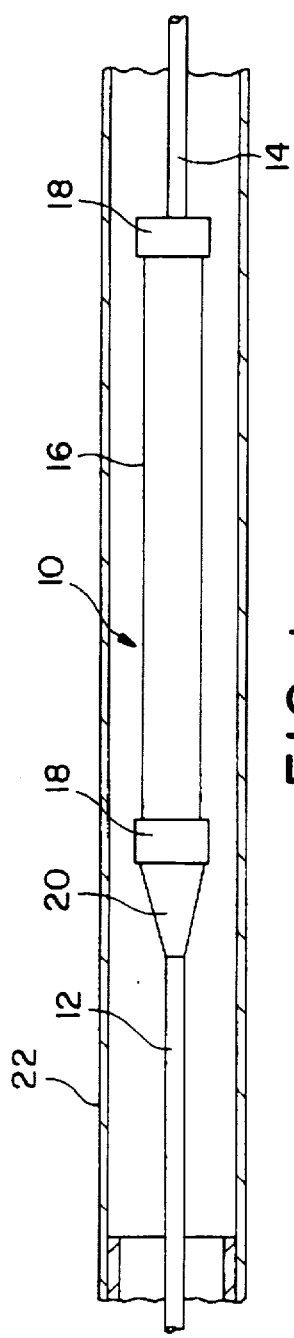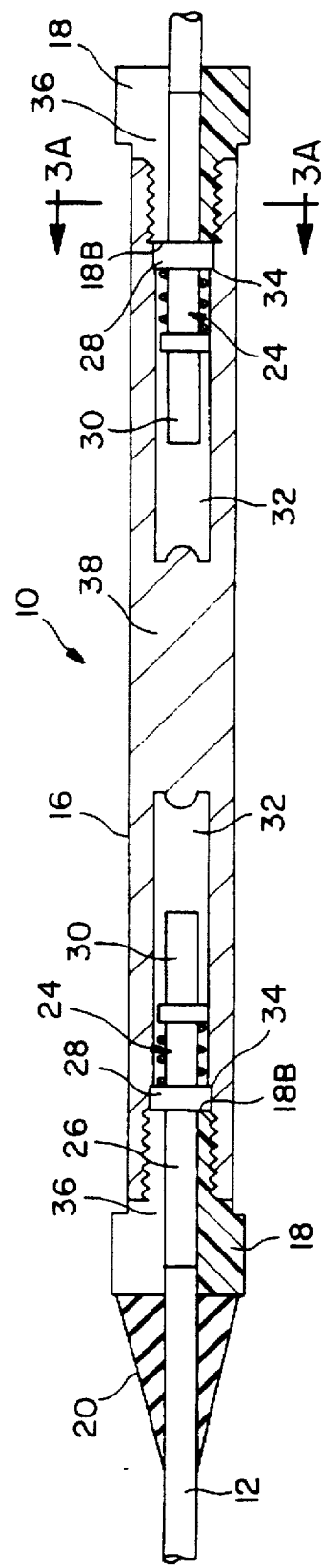

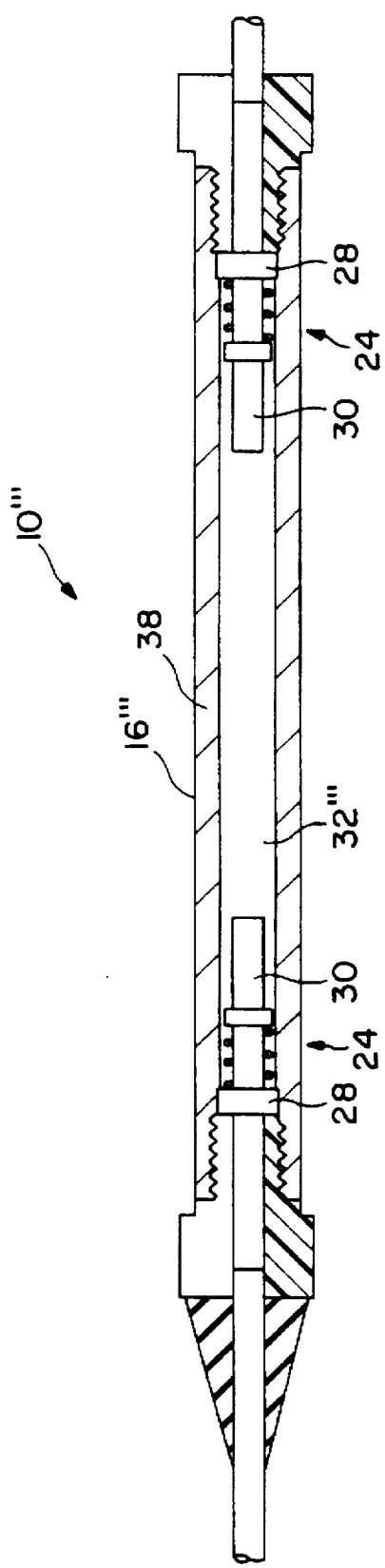
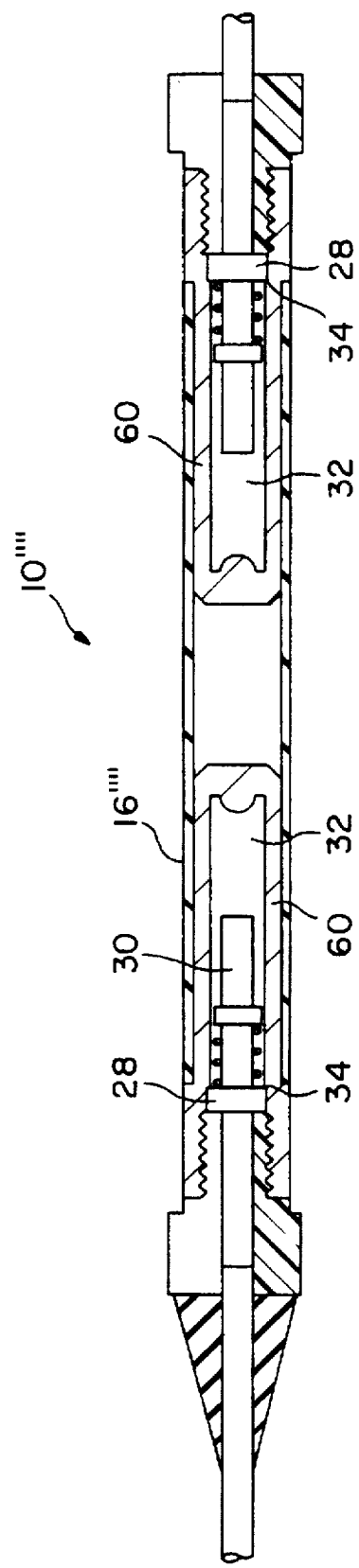

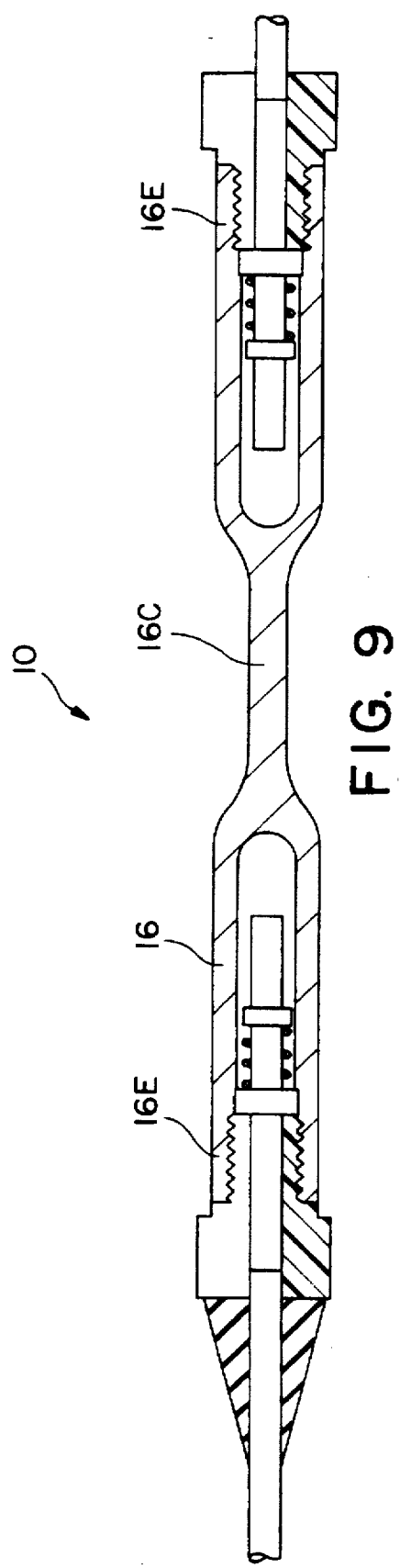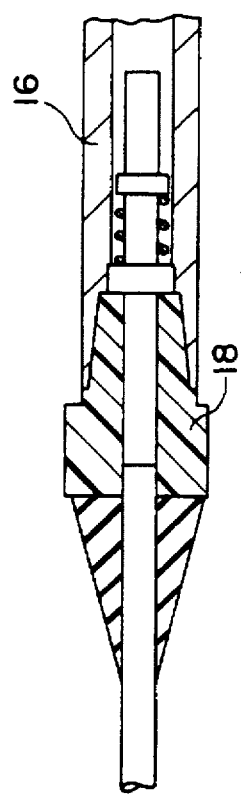

HOLDER FOR INSERTING AN OPTICAL FIBER IN A DATA COMMUNICATION SYSTEM

FIELD OF THE INVENTION

The present invention relates to fiber optic cables and, more particularly, to a holder for inserting an optical fiber in an existing data communication system.

BACKGROUND OF THE INVENTION

Fiber optic cabling is being used extensively in today's data communications environment. One reason for this is that optical fibers have high data carrying capability as compared to conventional insulated copper wire conductors.

One problem associated with fiber optic cabling is the difficulty associated with repair and replacement of damaged cables. As stated above, a single fiber can carry a considerable amount of data. If that fiber is damaged, some or all of the data can be lost. Many techniques have been developed over the years in an attempt to provide for ease of maintenance. Typically these techniques have been directed to splicing damaged fibers. A fiber splice involves cutting away the section of fiber and ferrule which is damaged. A new fiber and ferrule section is then added. The fiber of the new section must be accurately aligned and spaced with respect to the existing section in order to prevent or minimize transmission losses. As a result, the splicing of a damaged fiber is an extremely difficult and time consuming operation.

An alternate method for repairing a damaged fiber is by replacing the entire length of fiber. However, the location and routing of the fiber through the structure in which it is retained may make replacing the fiber a non-viable option. For example, in an aircraft which utilizes fiber optic cabling for transmitting data, such as the RAH-66 Comanche aircraft, the fiber optic cabling extends along numerous curved conduits and ducts. Replacement of a cable would require disconnecting both ends of the fiber and pulling the fiber out of the conduits. A new cable must then be inserted into and snaked through the conduits. Curves in the conduits may hamper or prevent the cable from being completely inserted. Hence, it is sometimes impossible to route a new fiber in a preexisting conduit.

In order to alleviate the problem of routing a new cable in a preexisting conduit, fiber optic cables are typically over-designed with additional "dummy" fibers. That is, the cable includes additional fibers which are not needed but, instead, function as back-up fibers in case one or more primary fibers fail. Repair of a damaged fiber simply requires the connection of the dummy fiber to the appropriate data connections. While this provides a satisfactory alternative to the insertion of new cables in an existing system, it also increases the cost of the cables and does not remedy the problem when an entire fiber optic cable is damaged.

A need therefore exists for a simple and inexpensive system for removing and replacing a damaged fiber optic cable in an existing data communication system.

SUMMARY OF THE INVENTION

The present invention relates to the replacement or insertion of a fiber in a data communication system and includes a holder adapted to connect a terminus of a first fiber to a terminus of a second fiber. The terminus of each fiber including an optical fiber surrounded by a ferrule. The ferrule is mounted within a plug member which has a shoulder portion. The holder includes a housing which has first and second openings formed therein. At least one chamber is formed in the housing and communicates with the first and second openings. The chamber is adapted to receive the termini of the first and second fibers. The holder also includes means for maintaining the termini in spaced apart relationship. In one embodiment, the termini are maintained in spaced apart relationship by means of two flanges at spaced locations within the chamber. The shoulder portion of each terminus seats against the flange when the terminus is placed within the chamber.

In one embodiment, a first cap interacts with the first opening and is removably attached to the housing. A channel is formed through the first cap for receiving a portion of the first fiber. The first cap retains the terminus of the first fiber within the chamber by pressing the shoulder portion against the flange. Similarly, a second cap interacts with the second opening and is removably attached to the housing. The second cap also has a channel formed through it for receiving a portion of the second fiber and retains the terminus of the second fiber within the chamber by pressing its shoulder portion against the flange. The housing may also include a spacer portion which separates the chamber into two chambers.

A method is also provided for drawing a fiber through a duct in a data communication system having an existing cable which extends between a first and second location. The method involves the steps of placing and retaining a first end of the cable within a chamber of a holder. A terminus of the fiber is then placed and retained within a chamber of the holder. The terminus of the fiber being maintained in spaced apart relationship from the first end of the cable so that the terminus and the first end do not contact one another. The cable is pulled at a distal location causing the holder and fiber to move through the duct from the first location to the second location. The terminus of the fiber is subsequently detached from the holder when the holder arrives at the second location and connected to a data connection.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

FIG. 1 shows the present invention being utilized to replace an existing fiber with a new fiber in a duct.

FIG. 3 is a sectional view of the holder according to the present invention.

FIG. 7 is a sectional view of a further embodiment of a holder according to the present invention.

FIG. 8 is a sectional view of an additional embodiment of a holder according to the present invention.

FIG. 9 is a sectional view of a flexible holder embodiment.

FIG. 10 is a sectional view of a portion of the holder showing a further form of attachment.

DETAILED DESCRIPTION OF THE DRAWINGS

Figure 2:
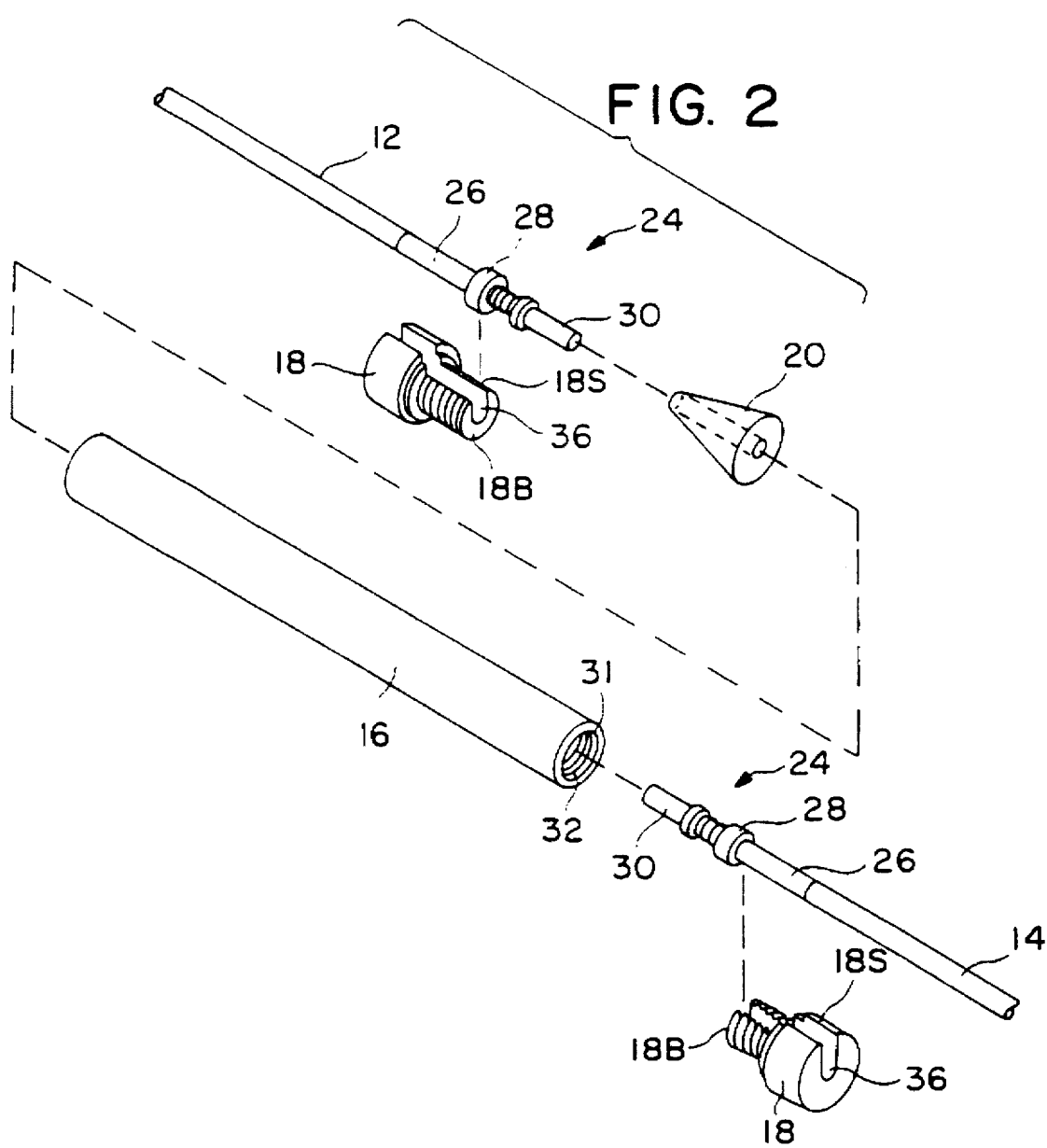
FIG. 2 is an exploded view of a holder according to the present invention.

Referring now to the drawings, wherein like numerals identify corresponding or similar elements throughout the several views, there is shown in FIG. 1 an embodiment of a holder 10. The holder 10 is utilized to connect two fibers 12, 14. The holder 10 includes a housing 16 and end caps 18. A boot 20 is shown in combination with the housing 16 and is preferably conical in shape. The holder 10 and fibers 12, 14 are shown positioned within the confines of a duct 22.

For the sake of simplicity, the illustrated embodiments show the holder 10 connecting only one set of fibers 12, 14. However, it should be readily apparent that the holder 10 can connect multiple sets of optical fibers or fiber cables.

Referring to FIG. 2, the holder 10 is shown by an exploded view. The fibers 12, 14 are conventional in the art with each having a terminus 24 at their ends. The termini 24 of the fibers 12, 14 each typically include a plug member 26 with a shoulder portion 28 formed around at least a portion of the periphery of the plug member 26. A ferrule 30 projects past the shoulder portion 28 of the plug member 26. The ferrule 30 surrounds an optical fiber (not shown). This is conventionally known as a pin-type ferrule. The ferrule 30 may also include an alignment sleeve (not shown) which assists in aligning two termini. This type of a ferrule is commonly known as a socket-type ferrule. The fibers 12, 14 are shown positioned for insertion through openings 31 formed in the ends of the housing 16. The fibers 12, 14 are preferably attached to the housing 16 by the caps 18. The caps 18 will be discussed in more detail below.

In FIG. 3, a cross-section of the holder 10 is shown with the termini 24 of the fibers 12, 14 positioned therein. The housing 16 is preferably substantially cylindrical in shape with at least one chamber 32 formed therein. In the illustrated embodiment there are two chambers 32, one formed in each end of the housing 16. When the fibers 12, 14 are attached to the holder 10, at least a portion of each termini 24 is located within one of the chambers 32. The chambers 32 are configured to accept the ferrule 30 of the terminus 24. The size of the ferrule 30 will normally determine the chamber size (e.g., length, diameter). Military Specification MIL-T-29504/4A specifies approved standard ferrule and termini dimensions for military uses. A standard diameter for a pin-type ferrule is approximately 0.0625 inches. A standard diameter for a socket-type ferrule is approximately 0.117 inches. A standard diameter for the shoulder portion of the plug member is approximately 0.130 inches. The chambers 32 are preferably configured to accept both the pin and socket-type ferrules.

A step 34 is formed around at least a portion of the periphery of each chamber 32. The step 34 is preferably sized slightly smaller in diameter than the shoulder portion 28 of the plug member 26 (e.g., less than 0.130 inches) so as to limit the axial travel of the fiber terminus 24 into the chamber 32. Hence, when a fiber is completely inserted into the housing 16, the shoulder portion 28 seats against the step 34, thereby locating the ferrule 30 within the chamber 32.

The length of the chamber 32 depends on the length of the ferrule 30 projecting past the shoulder portion 28. This length can vary anywhere from about 0.25 inches to over an inch. It is preferable that the chamber 32 be designed to accommodate a wide range of ferrule lengths such that the ferrules do not contact the end of the chamber 32 or each other.

The cap 18 attaches each fiber 12, 14 to the housing 16 to prevent the terminus 24 from sliding out of the chamber 32. More particularly with reference to FIGS. 2 and 3, the base 18B of cap 18 contacts the shoulder portion 28 of the plug member 26 urging it against the step 34 of the housing 16. Thus, the cap 18 functions to retain the terminus 24 within the housing 16.

Figure 3A:
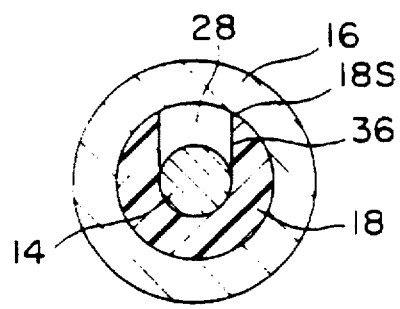
FIG. 3A is sectional view of the holder taken along lines 3A—3A FIG. 3.

As shown in FIG. 2, the cap 18 has a channel 36 formed through it for receiving a portion of the fiber 12, 14. In a preferred embodiment, the channel 36 extends to the lateral side 18S of the cap 18 forming a slot for permitting the fiber 12, 14 to be slid into and out of the channel 36. FIG. 3A shows a cross-section of the cap 18 and the position of the fiber 14 within the channel 36. The cap 18 preferably has external threads formed thereon which mate with corresponding internal threads formed on a portion of the housing 16. Alternately, the threads on the cap 18 can be internal threads which mate with corresponding external threads formed on the housing 16. Other attachment mechanisms can be substituted for the threads without detracting from the invention. For example, the cap could be press-fit into engagement with the housing 16 as shown in FIG. 10. A key and latch arrangement could also be utilized.

Figure 4:
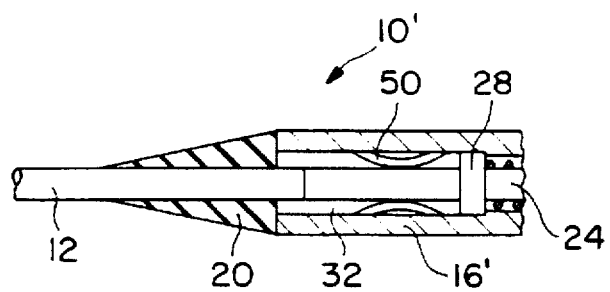
FIG. 4 is a sectional view of a portion of the holder showing an alternate attachment embodiment.

Another embodiment of the a holder 10' is shown in FIG. 4. In this embodiment, the cap 18 is replaced by a locking mechanism formed in the housing 16'. As illustrated, a spring clip 50 is included in the chamber 32 and reciprocates within the housing 16 between a normal and deflected position. In the normal position, the spring clip 50 prevents the shoulder portion 28 from exiting out of the housing 16'. When the spring clip 50 is in its deflected position, the shoulder portion can readily pass into and out of the housing 16'. A standard fiber optic removal or extraction tool can be used to facilitate insertion and removal of the termini 24 from the holder 10' by moving it past the clip 50.

Figure 5:
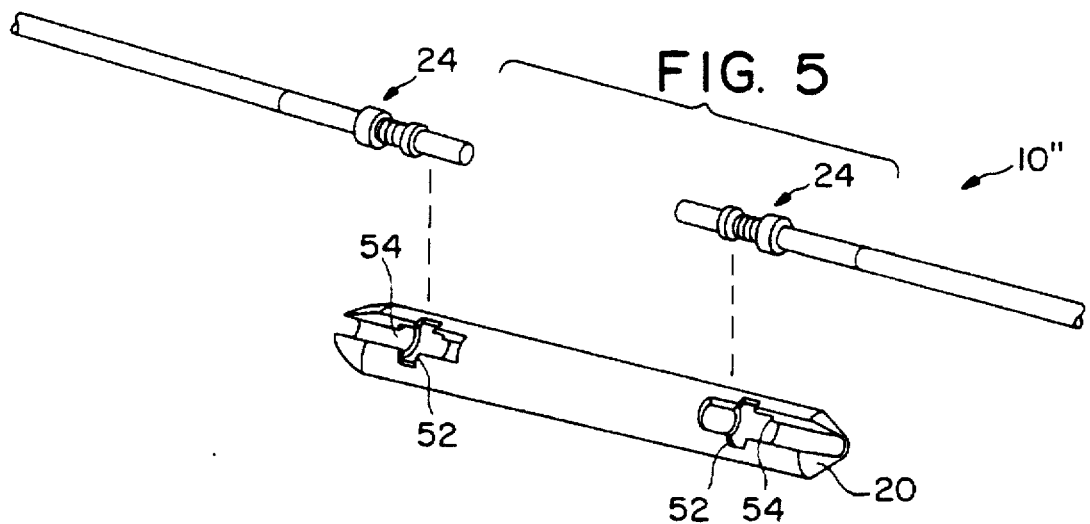
FIG. 5 is an exploded view of another attachment embodiment for the holder.
Figure 6:
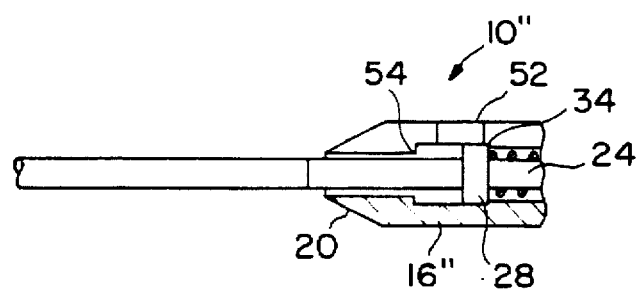
FIG. 6 is a sectional view of a portion of the holder of FIG. 5.

Another embodiment of the holder 10" is shown in FIGS. 5 and 6. The housing 16" has one or more slots 52 formed along its side which are configured to permit the terminus 24 of the fibers 12, 14 to be slid laterally into the chamber 32. As illustrated, the boot 20 is formed integral with the housing 16". A retention flange 54 is formed near each end of the housing 16" and comprises a necked-down or stepped portion of the housing 16" which prevents the terminus 24 from being pulled axially out of the housing 16". Accordingly, when the terminus 24 of the fiber 12 is placed within the chamber 32", the step 34 and the retention flange 54 function to limit the axial movement of the terminus 24 within the housing 16" A closure clip or similar type device (not shown) can be attached over each slot 52 after the terminus 24 has been to placed in the chamber 32" to prevent the terminus 24 from laterally sliding out. Those skilled in the art would readily understand and appreciate the diverse attachment/retention mechanisms that can be practiced within the purview of the claims.

As discussed above, the steps 34 are located within the housing 16 (16' and 16") so as to maintain the ferrules 30 of the termini 24 in spaced apart relationship. As shown in FIG. 3, the housing 16 may also include a spacer 38 which comprises a portion of the housing 16 between the chambers 32. The spacer 38 is shown as being integral with the housing 16. However, it is also contemplated that the spacer 38 may be a separate piece of material located within the housing 16. In either embodiment, the spacer defines the length of the individual chambers 32.

FIG. 7 illustrates a further alternate embodiment of the holder 10'''. In this embodiment, there is only one chamber 32''' formed within the holder housing 16 which extends between both ends. The termini 24 of both fibers 12, 14 are located within the chamber 32''' when the fibers 12, 14 are attached to the holder 10'''. In this embodiment, a portion of the housing 16 functions as the spacer 38.

FIG. 8 illustrates yet another embodiment of the holder 10'''' wherein the chambers 32 are formed in individual containment members 60. Each containment member 60 includes a step 34 which limits the axial translation of the terminus 24 into the chamber 32. The individual containment chambers 60 are disposed within and attached to the housing 16''''. In the illustrated embodiment, the individual members 60 are press-fit into the housing 16''''. As with the previous embodiments, the steps 34 act to prevent the termini 24 from contacting one another.

The holder 10 can be made from any suitable material although a lightweight and inexpensive material, such as plastic or rubber, is preferred. The cap 18 may be made from plastic, rubber or metallic material such as aluminum. If a boot 20 is utilized it is preferably made from rubber to permit it to be stretched over the terminus 24 of the fiber.

The holder according to the present invention is employed as follows for replacing an existing fiber 12 (e.g., a damaged optical fiber) with a new fiber 14. For the sake of simplicity, the use of the holder is discussed with reference to the embodiment shown in FIGS. 1 through 3. However, those skilled in the art would readily comprehend how the alternate embodiments of the holder are utilized for replacing an existing fiber. One terminus 24 of the existing fiber 12 is disconnected from its data connection. A boot 20 is preferably placed over the fiber 12. The terminus 24 is then inserted into the chamber 32 of the housing 16 until the shoulder portion 28 contacts the step 34. A first cap 18 is positioned around a portion of the fiber 12 and threaded into engagement with the housing 16. The boot 20 is then slid against the cap 18. The terminus 24 of the new fiber 14 is inserted into the opposite chamber 32 in the housing 16. A second cap 18 is placed around a portion of the new fiber 14 and threaded into engagement with the housing 16. A second end of the new fiber 14 is connected to the data connection. The existing fiber 12 is then pulled at a distal location resulting in the holder 10 and the connected termini being pulled through the existing ducts 22 toward the distal location.

When the holder reaches the distal location, a second terminus of the existing fiber 12 is disconnected from its data connection. The first terminus 24 of the new fiber 14 is then removed from the holder 10 and connected to the data connection.

It is also contemplated that the holder 10 can be utilized to attach a new fiber where one has not existed previously. In this procedure, during fabrication of the ductwork for containing the fiber, a cable, string or similar component is temporarily placed within the ductwork between the two data connections. When it is desired to insert the new fiber into the ductwork, the cable is attached to on end of the holder. The terminus of the new fiber is attached to the other end of the holder 10 as described above. The cable is then pulled at a distal location drawing the holder 10 and new fiber terminus 24 through the ductwork.

The boot 20 is utilized to facilitate travel of the holder through the ductwork. The boot 20 is preferably conical in shape providing a smooth surface which helps prevent the holder 10 from becoming caught on protruding 10 edges within the ductwork. While the boot 20 is shown separate from the cap 18, it may alternately be formed integral with the cap if desired.

In order to permit the holder 10 to travel through curved portions of the ductwork, the holder 10 is preferably designed with a degree of flexibility. The amount of holder flexibility will depend on the materials chosen and the configuration of the holder. In FIG. 9, the housing 16 of the holder 10 is necked-down in the center 16C (i.e., the center 16C of the housing 16 has a smaller diameter then the housing ends 16E). This results in the center 16C having reduced bending stiffness as compared to the ends 16E. The reduction in bending stiffness of the center 16C allows the ends 16E to flex or bend about the center 16C. This added degree of flexibility permits the holder 10 to more easily snake through the ductwork. Various other methods exist for incorporating flexibility into the holder and are well within the knowledge of those skilled in the art.

The novel holder disclosed above provides an inexpensive mechanism for assisting in the removal and/or insertion of fiber optic cables in an existing data communication system.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A fiber optic holder for connecting a terminus of a first fiber to a terminus of a second fiber, each terminus including an optical fiber surrounded by a ferrule mounted within a plug member, the plug member having a shoulder portion, the holder comprising:

a housing having first and second openings formed therein;

at least one chamber formed in the housing in communication with the first and second openings, the chamber adapted to accept the termini of the first and second fibers, the chamber having a chamber wall;

a first cap removably attachable to the housing, the first cap having a channel for receiving a portion of the first fiber, the first cap retaining the terminus of the first fiber within the at least one chamber;

a second cap interacting with the second opening and being removably attachable to the housing, the second cap having a channel for receiving a portion of the second fiber, the second cap retaining the terminus of the second fiber within the at least one chamber;

means for maintaining the first and second termini in spaced apart relationship from each other and from the chamber wall; and wherein the channel in each cap extends to a lateral side of the cap for permitting the fiber to slide into the channel.

2. A fiber optic holder according to claim 1 wherein the means for maintaining the first and second termini in spaced apart relationship comprises a first step formed around at least a portion of the periphery of the chamber at a first location for limiting the axial travel of the first terminus into the chamber, and a second step formed around at least a portion of the periphery of the chamber at a second location for limiting the axial travel of the second terminus into the chamber, the first and second locations being spaced from one another so as to prevent the termini of the fibers from contacting one another when placed within the chambers, and wherein the first cap presses the shoulder portion of the first fiber against the first step for retaining the termini in the chamber, and wherein the second cap presses the shoulder portion of the second fiber against the second step for retaining the termini in the chamber.

3. A fiber optic holder according to claim 1 wherein the first and second caps are threadingly engaged to the housing.

4. A fiber optic holder according to claim 1 wherein the housing is made from a flexible material.

5. A fiber optic holder according to claim 4 wherein the flexible material is plastic.

6. A fiber optic holder according to claim 1 comprising at least one boot for removably attaching to one of the fibers, the boot being located adjacent to one of the caps when the cap attaches the fiber to the housing.

7. A fiber optic holder according to claim 6 wherein the at least one boot is made from rubber material and has a conical shape.

8. A fiber optic holder according to claim 1 wherein the caps are press-fit into the housing.

9. A fiber optic holder according to claim 1 wherein the means for maintaining the termini in spaced apart relationship comprises steps formed around at least a portion of the periphery of the chamber, the steps being spaced from one another so as to prevent the termini from contacting one another when attached to the housing.

10. A fiber optic holder for connecting a terminus of a first fiber to a terminus of a second fiber, each terminus including an optical fiber surrounded by a ferrule mounted within a plug member, the plug member having a shoulder portion, the holder comprising:

a housing having first and second openings formed therein;

at least one chamber formed in the housing in communication with the first and second openings, the chamber adapted to accept the termini of the first and second fibers, the chamber having a chamber wall;

a first cap removably attachable to the housing, the first cap having a channel for receiving a portion of the first fiber, the first cap retaining the terminus of the first fiber within the at least one chamber;

a second cap interacting with the second opening and being removably attachable to the housing, the second cap having a channel for receiving a portion of the second fiber, the second cap retaining the terminus of the second fiber within the at least one chamber;

means for maintaining the first and second termini in spaced apart relationship from each other and from the chamber wall; and wherein a center of the housing has a reduced bending stiffness as compared to the housing ends.

11. A fiber optic holder according to claim 10 further comprising at least one boot for removably attaching to one of the fibers, the boot being located adjacent to one of the caps when the cap attaches the fiber to the housing.

12. A fiber optic holder for connecting a terminus of a first fiber to a terminus of a second fiber, each terminus including an optical fiber surrounded by a ferrule mounted within a plug member, the plug member having a shoulder portion, the holder comprising:

a housing having first and second openings formed therein;

at least one chamber formed in the housing in communication with the first and second openings, the chamber adapted to accept the termini of the first and second fibers, the chamber having a chamber wall;

a first cap removably attachable to the housing, the first cap having a channel for receiving a portion of the first fiber, the first cap retaining the terminus of the first fiber within the at least one chamber;

a second cap interacting with the second opening and being removably attachable to the housing, the second cap having a channel for receiving a portion of the second fiber, the second cap retaining the terminus of the second fiber within the at least one chamber;

means for maintaining the first and second termini in spaced apart relationship from each other and from the chamber wall; and wherein the housing has two ends and a center section, and wherein the center section has a dimensionally smaller diameter then the housing ends.

13. A fiber optic holder for inserting a fiber into a data communication system, the holder connecting a terminus of a first fiber to a terminus of a second fiber, each terminus having a plug member with a shoulder portion, the holder comprising:

a housing having first and second openings formed therein;

a first chamber formed in the housing and communicating with the first opening, the first chamber adapted to accept the terminus of the first fiber, the first chamber having a chamber wall;

a first cap threadingly engagable to the housing, the first cap having a channel formed therethrough for receiving a portion of the first fiber, the first cap retaining the terminus of the first fiber within the first chamber;

a second chamber formed in the housing and in communication with the second opening, the second chamber adapted to accept the terminus of the second fiber, the second chamber having a chamber wall;

a second cap threadingly engagable to the housing, the second cap having a channel formed therethrough for receiving a portion of the second fiber, the second cap retaining the terminus of the second fiber within the second chamber;

means for maintaining the first and second termini in spaced apart relationship from each other and from the chamber wall; and wherein the channel in each cap extends to a lateral side of the cap for permitting the fiber to slide into the channel.

14. A fiber optic holder according to claim 13 wherein the means for maintaining the first and second termini in spaced apart relationship comprises a step formed around at least a portion of the periphery of each chamber for limiting the axial travel of the termini into the chambers, and wherein the first cap presses the shoulder portion of the first fiber against the step of one chamber for retaining the termini within the chamber, and wherein the second cap presses the shoulder portion of the second fiber against the step of the other chamber for retaining the termini in the chamber.

15. A fiber optic holder according to claim 13 wherein the means for maintaining the first and second termini in spaced apart relationship comprises a step formed around at least a portion of the periphery of each chamber for limiting the axial travel of the termini into the chambers, and wherein each cap has a base portion which limits axial travel of the terminus out of the chamber.

16. A fiber optic holder for connecting termini of first and second fibers, the holder comprising:

a housing having first and second openings;

a chamber formed within the housing and in communication with the openings, the chamber adapted to receive at least a portion of the termini of the first and second fibers, the chamber having a chamber wall;

means for removably attaching the first and second fibers to the housing so as to position the termini of the first and second fibers within the chamber and for preventing the termini from exiting the chamber;

means for maintaining the termini in spaced apart relationship from each other and from the chamber wall; and wherein the means for removably attaching the first and second fibers to the housing comprises:

at least one slot formed in the housing in communication with the chamber, the slot adapted to accept the termini of the fibers;

at least one retention flange formed in the housing near one of the openings in the housing, the retention flange adapted to prevent the terminus of the fiber from axially passing through the opening in the housing when the termini is in the chamber.

17. A fiber optic holder according to claim 16 wherein there are two slots formed in the housing, each slot accepting a terminus of a fiber and wherein there are two retention flanges formed in the housing, one adjacent to each opening in the housing.

18. A fiber optic holder according to claim 16 wherein at least a portion of the housing is flexible.

19. A fiber optic holder for connecting termini of first and second fibers, the holder comprising:

a housing having first and second openings;

a chamber formed within the housing and in communication with the openings, the chamber adapted to receive at least a portion of the termini of the first and second fibers, the chamber having a chamber wall;

means for removably attaching the first and second fibers to the housing so as to position the termini of the first and second fibers within the chamber and for preventing the termini from exiting the chamber;

means for maintaining the termini in spaced apart relationship from each other and from the chamber wall; and wherein a center of the housing has a reduced bending stiffness as compared to the housing ends.

20. A fiber optic holder according to claim 19 wherein the means for removably attaching the first and second fibers to the housing attaches the fibers to opposite ends of the housing and wherein the means for maintaining the termini in spaced apart relationship is a portion of the housing between the housing ends which results in a gap between the termini when the fibers are attached to the housing.

21. A fiber optic holder according to claim 19 wherein the means for removably attaching the first and second fibers to the housing comprises reciprocating spring clips mounted within the housing adjacent to each opening.

22. A fiber optic holder according to claim 19 further comprising at least one boot for removably attaching to one of the fibers, the boot being located adjacent to one of the caps when the cap attaches the fiber to the housing.

23. A fiber optic holder according to claim 22 wherein the at least one boot is made from rubber material and has a conical shape.

24. A fiber optic holder for connecting termini of first and second fibers, the holder comprising:

a housing having first and second openings;

a chamber formed within the housing and in communication with the openings, the chamber adapted to receive at least a portion of the termini of the first and second fibers, the chamber having a chamber wall;

means for removably attaching the first and second fibers to the housing so as to position the termini of the first and second fibers within the chamber and for preventing the termini from exiting the chamber;

means for maintaining the termini in spaced apart relationship from each other and from the chamber wall; and wherein the housing has two ends and a center section, and wherein the center section has a dimensionally smaller diameter then the housing ends.

25. A fiber optic holder for connecting termini of first and second fibers, the holder comprising:

a housing having first and second openings;

a chamber formed within the housing and in communication with the openings, the chamber adapted to receive at least a portion of the termini of the first and second fibers, the chamber having a chamber wall;

means for removably attaching the first and second fibers to the housing so as to position the termini of the first and second fibers within the chamber and for preventing the termini from exiting the chamber;

means for maintaining the termini in spaced apart relationship from each other and from the chamber wall; and wherein the means for removably attaching the fibers to the housing comprises first and second caps, each cap having a channel which extends to a lateral side of the cap for permitting the fiber to slide into the channel.

26. A fiber optic holder according to claim 25 wherein the means for maintaining the termini in spaced apart relationship comprises a first step formed around at least a portion of the periphery of the chamber at a first location and a second step formed around at least a portion of the chamber at a second location, the steps limiting axial translation of the termini into the chamber and preventing the termini from contacting one another, and wherein the caps limit axial translation of the termini out of the chamber when the caps are attached to the housing.

27. A method for replacing a first fiber in a data communication system with a second fiber, the first fiber extending from a first data connection to a second data connection, the method comprising the steps of:

disconnecting a terminus of the first fiber from the first data connection;

placing the terminus within a chamber of a holder;

attaching the first fiber to the holder;

placing a terminus of the second fiber within a chamber of the holder, the terminus of the second fiber being maintained in spaced apart relationship from the terminus of the first fiber so that the two termini do not contact one another;

attaching the second fiber to the holder;

pulling the first fiber at a distal location so as to cause the holder to move from the first data connection to the second data connection;

disconnecting a second terminus of the first fiber from the second data connection;

detaching the termini from the holder when the holder arrives at the second data connection; and connecting the terminus of the second fiber to the second data connection.

28. A method for drawing a fiber through a duct in a data communication system, the duct having an existing cable therein which extends between a first and second locations, the method comprising the steps of:

placing and retaining a first end of the cable within a chamber of a holder;

placing and retaining a terminus of the fiber within a chamber of the holder, the terminus of the fiber being maintained in spaced apart relationship from the first end of the cable so that the terminus and the first end do not contact one another;

pulling the cable at a distal location so as to cause the holder to move through the duct from the first location to the second location;

detaching the terminus of the fiber from the holder when the holder arrives at the second location; and connecting the terminus of the fiber to a data connection.

* * * * *